Feb. 25, 1930.        S. ANCHACLES        1,748,694
ATTACHMENT FOR VEHICLES
Filed Jan. 12, 1929        2 Sheets-Sheet 1

Feb. 25, 1930.   S. ANCHACLES   1,748,694
ATTACHMENT FOR VEHICLES
Filed Jan. 12, 1929   2 Sheets-Sheet 2
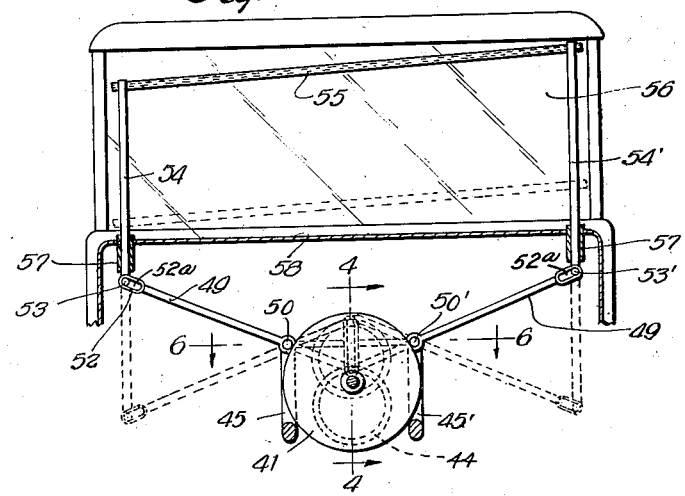
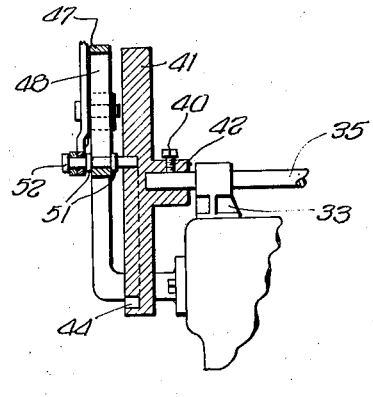
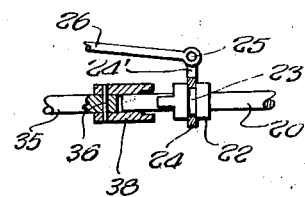
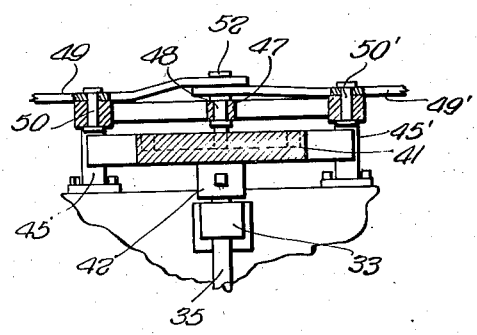

Patented Feb. 25, 1930

1,748,694

UNITED STATES PATENT OFFICE

SARANTOS ANCHACLES, OF WHITING, INDIANA

ATTACHMENT FOR VEHICLES

Application filed January 12, 1929. Serial No. 332,116.

My invention relates to attachments for vehicles and has to do more particularly with windshield wipers for automobiles and similar vehicles.

An object of my invention is to provide a device of the type referred to which may be operated from the driving mechanism of a motor vehicle and may be controlled by a vehicle operator from the driving position to bring the device in or out of operation as desired.

A further object is to provide such a device which will be adapted to wipe substantially the entire windshield of the vehicle upon which it is mounted.

Another object is to provide such a device which will reciprocate up and down on a windshield and will be effective on both of its strokes.

A still further object is to provide such a device which will consist of a small number of comparatively simple parts, and which will be certain in operation, rugged and satisfactory for use wherever desirable.

Many other objects and advantages of the construction herein shown and described will be obvious to those skilled in the art from the disclosure herein given.

To this end my invention consists in the novel construction, arrangement and combination of parts herein shown and described, and more particularly pointed out in the claims.

In the drawings, wherein like reference characters indicate like or corresponding parts:

Fig. 3 is a sectional view taken on the line 3—3 of Fig. 1;

Fig. 4 is a sectional view taken on the line 4—4 of Fig. 3;

Fig. 5 is a sectional view taken on the line 5—5 of Fig. 2; and

Fig. 6 is a sectional view taken on the line 6—6 of Fig. 3.

Figure 1:
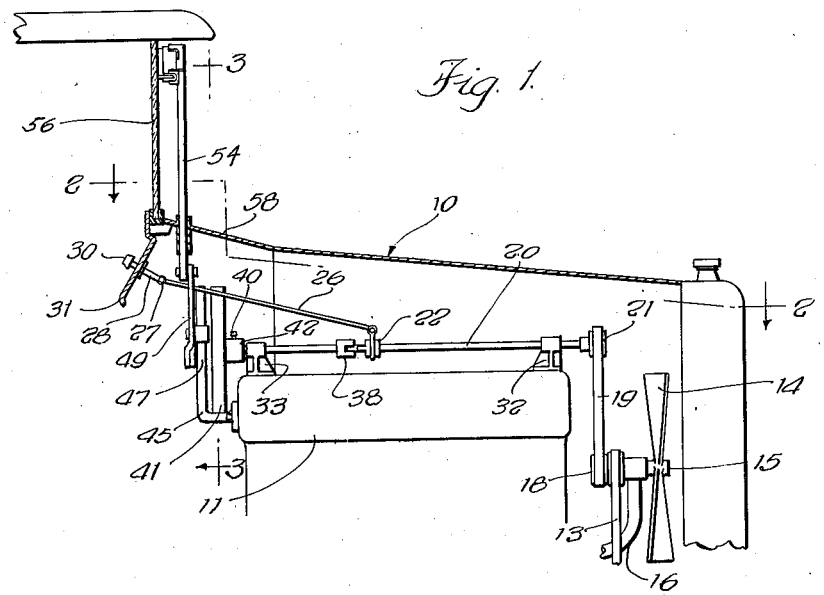
Fig. 1 represents a vertical sectional view through a motor vehicle shown fragmentarily, on which is mounted a device embodying my invention, the latter being shown in elevation.
Figure 2:
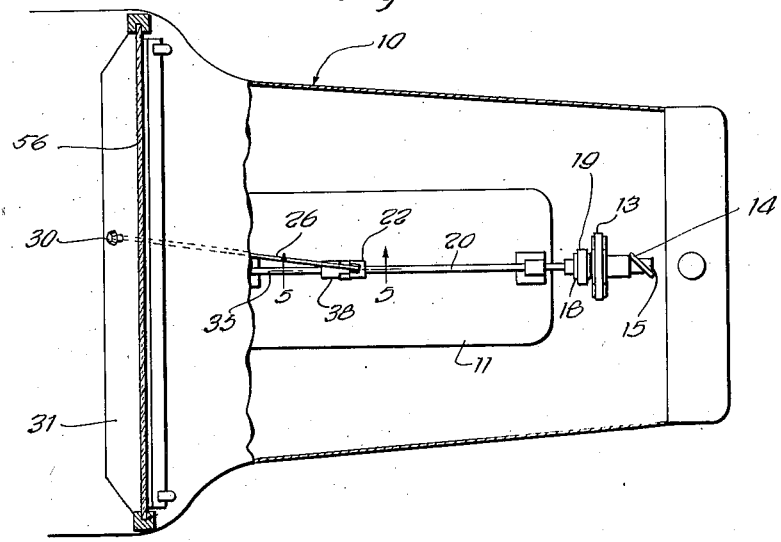
Fig. 2 is a sectional view taken on the line 2—2 of Fig. 1.

In the particular preferred embodiment shown in the drawings, the numeral 10 indicates generally an automobile which, in the embodiment shown, is motivated by means of an internal combustion engine inclosed in a casing indicated at 11. Connected to the crank shaft of the motor (not shown) is a belt 13 which actuates a fan 14, this fan being mounted on a shaft 15 carried by a suitable bracket 16. This fan is part of the cooling system and is all in accordance with the usual construction of motor vehicles of this type.

Secured to the fan shaft 15 is a pulley 18 engaging a belt 19, this belt transmitting power to a shaft 20 to which it is connected by means of a pulley 21 secured to the shaft 20. Slidably keyed on the shaft 20 Fig. 5, is a clutch member 22 having a peripheral groove 23. Ridable in the groove 23 is a ring 24 having an ear 24' to which is pivoted, as at 25, a link 26 which in turn is pivoted as at 27 to a lever 28 having a manipulating knob 30. It will be seen from Fig. 1 that the lever 28 passes through a suitable aperture in the dash or instrument board 31 of the vehicle. Thus, the clutch may be readily manipulated by the operator of the vehicle from the driver's seat by means of the knob 30 and the lever and link connected thereto, inasmuch as the knob is readily accessible to the operator.

The shaft 20 is rotatably supported above the motor casing by means of a bearing bracket 32 and a second similar bracket 33 secured to the motor casing carries a shaft 35 aligned with the shaft 20. Secured to one end of the shaft 35 by means of a pin 36, or other suitable means, is a cooperating clutch member 38 and attached to the other end of the shaft 35, as by means of a set screw 40, is a disc 41, the set screw passing through a collar 42 which is preferably integral with the disc. A circular eccentric groove 44 is formed on one face of the disc 41.

Secured to the motor casing by any suitable means is a pair of brackets 45 and 45', these brackets being substantially rectangular so as to project laterally from the motor casing and thence upwardly. Adjacent the upper extremities of the brackets 45 and 45' is a connecting bar 46 on which is formed a cross portion 47 having a slot 48 formed therein. A pair of links 49 and 49' are pivotally secured, as at 50 and 50', to the junction points between the brackets 45 and 45' and the connecting bar 46, the adjacent ends of these links being pivotally secured together by means of a pin 52. This pin as shown best in Figs. 3 and 4 extends through the slot 48 of the cross portion 47 of the connecting bar 46, suitable retaining rings 51 being provided, and slidably engages the eccentric groove 44 of the disc 41. At their outer ends, the links 49 and 49' are slotted as at 52ª, these slots engaging pins 53 and 53'. These pins serve pivotally to connect the links 49 and 49' to rods 54 and 54' which are secured to a squeegee 55 of any suitable type. The squeegee is normally in contact with a windshield 56. The rods 54 and 54' pass through sleeves 57 and 57' in the cowl 58 of the vehicle. It will be noted that the squeegee 55 is normally disposed at an angle to the horizontal for the reason that in the upward movement thereof, liquid wiped from the face of the windshield 56 may flow along the upper edge of the squeegee and run off of the end thereof instead of flowing over the edge of the squeegee and running down the windshield at various points intermediate of its ends, thus clouding the vision of the operator.

It is believed that the operation of the embodiment of my invention described above will be readily apparent from the description herein given. As soon as the motor is set in operation, the fan and fan shaft will begin to rotate, thus actuating the belt 19 and through it, the shaft 20. Normally of course, the clutch member 22 will be so disposed on the shaft 20, as shown in Figs. 1 to 5, that it does not cooperate with the clutch member 38 and, hence, the shaft 35 will be stationary together with the various parts connected thereto.

When it is desired to set the squeegee in operation, the operator grasps the knob 30 of the lever 28, pulling it toward him. This results in moving the clutch member 22 along the shaft 20 and into cooperative relation with the clutch member 38; thus causing the shaft 35 to rotate. When this occurs, the disc 41, being secured to the shaft 35, will also rotate and the pin 52 will be caused to slide in the eccentric groove 44 of the disc, thus being moved in an up and down direction in the slot 48 of the cross member 47. This results in oscillating the link 49 about its pivot 50 and the link 49' about its pivot 50', thus reciprocating the rods 54 and 54' and the squeegee 55 carried thereby. When the pin 52 is at its lowermost position, as shown in Figs. 3 and 4, the squeegee 55 will be at its extreme upper position and vice versa. When it is desired to discontinue the movement of the squeegee, the operator merely depresses the knob 30, thus moving the clutch member 22 out of cooperative relation with the clutch member 38 so that motion is no longer transmitted to the shaft 35.

It will be seen from what has been set forth above that I have provided an extremely simple device and one which, because of its comparative simplicity and small number of parts, will be of long life and very unlikely to get out of order. Furthermore, the entire windshield is cleaned by means of apparatus embodying my invention, so that the operator need not concentrate his vision upon a very small portion of the glass which is maintained clear of moisture but may look through any portion thereof as desired, and thus has a much wider angle of vision than is ordinarily provided and is enabled to avoid accidents. It is also note-worthy that by means of the angular arrangement of the squeegee 55, the wiping of the glass is effective on the upward as well as on the downward stroke of the squeegee and hence, the glass may be maintained substantially clear at all times.

Having thus described my invention, it is obvious that various immaterial modifications may be made in the same without departing from the spirit of my invention; hence I do not wish to be limited to the exact form, construction, arrangement and combination of parts herein shown and described except as may appear from the following claims.

What I claim as new and desire to secure by Letters Patent is:

1. In an attachment for vehicles having a windshield, the combination with a movable element employed in operating the vehicle, of a reciprocating squeegee cooperable with and extending substantially across the windshield and inclined at an angle to its direction of movement, and means connected to said squeegee and connectible to said element for reciprocating the squeegee in a manner to wipe substantially the entire surface of the windshield.

2. In an attachment for vehicles having a windshield, the combination with a movable element employed in operating the vehicle, of a vertically reciprocating squeegee cooperable with the windshield and inclined at an angle to the horizontal, means for connecting said squeegee and element for actuating the squeegee in a manner to wipe substantially an entire surface of the windshield, and means actuated by the operator of the vehicle for actuating said connecting means.

3. In an attachment for vehicles having a windshield, the combination with a movable element employed in operating the vehicle, of a squeegee mounted to reciprocate across the windshield so as to wipe substantially the entire surface thereof on each stroke of said squeegee, a shaft connected to said element, means for translating the rotary motion of said shaft to reciprocating up and down motion of said squeegee, said means comprising an eccentric carried by said shaft, means connected to said squeegee and motivated by said eccentric, and a stationary member for restricting the movement of said last named means to a single plane.

4. In an attachment for vehicles having a windshield, the combination with a movable element employed in operating the vehicle, of a squeegee mounted to move bodily up and down against the windshield so as to wipe substantially an entire surface thereof on each stroke of said squeegee, a shaft connected to said element, and means for translating the rotary motion of said shaft to reciprocating up and down motion of said squeegee, said means comprising an eccentric carried by said shaft, means connected to said squeegee and motivated by said eccentric, and a stationary member for restricting the movement of said last named means to a substantially vertical plane.

5. In an attachment for vehicles having a windshield, the combination with a movable element employed in operating the vehicle, of a squeegee mounted to reciprocate across the windshield so as to wipe substantially the entire surface thereof on each stroke of said squeegee, a shaft connected to said element, means for translating the rotary motion of said shaft to reciprocating up and down motion of said squeegee, said means comprising a disc carried by said shaft and having an eccentric groove therein, a member connected to said squeegee and having a pin riding in said groove, and a stationary member having a slot therein for restricting the movement of said pin to a single plane.

6. In an attachment for vehicles having a windshield, the combination with a movable element employed in operating the vehicle, of a squeegee mounted to move bodily up and down against the windshield so as to wipe substantially an entire surface thereof on each stroke of said squeegee, a shaft connected to said element, and means for translating the rotary motion of said shaft to reciprocating up and down motion of said squeegee, said means comprising a disc carried by said shaft and having an eccentric groove therein, a member connected to said squeegee and having a pin riding in said groove, and a stationary member having a slot therein for restricting the movement of said pin to a substantially vertical plane.

In witness whereof, I hereunto subscribe my name this 18th day of December A. D., 1928.

SARANTOS ANCHACLES.